US005788324A

United States Patent [19]
Shea et al.

[11] Patent Number: 5,788,324
[45] Date of Patent: Aug. 4, 1998

[54] SEAT ASSEMBLY WITH FOLD-OUT ARMREST

[75] Inventors: Paul H. Shea, Livonia; Steven M. Jakubiec, Bloomfield, both of Mich.

[73] Assignee: Chrysler Corporation, Auburn Hills, Mich.

[21] Appl. No.: 859,306

[22] Filed: May 20, 1997

[51] Int. Cl.$^6$ .................................................. A47C 13/00
[52] U.S. Cl. ................ 297/113; 297/188.04; 297/378.1; 297/411.32
[58] Field of Search .................... 297/188.04, 188.1, 297/188.01, 188.14, 188.21, 378.1, 411.32, 411.3, 411.2, 115, 113, 112, 233, 232, 248

[56] References Cited

U.S. PATENT DOCUMENTS

| | | |
|---|---|---|
| 2,942,649 | 6/1960 | Wells . |
| 3,336,077 | 8/1967 | Radke et al. . |
| 3,374,032 | 3/1968 | Giudice . |
| 3,877,747 | 4/1975 | Brennan et al. . |
| 4,065,174 | 12/1977 | Yokohama et al. . |
| 4,533,175 | 8/1985 | Brennan . |
| 4,637,648 | 1/1987 | Okino et al. . |
| 4,685,729 | 8/1987 | Heesch et al. . |
| 4,756,459 | 7/1988 | Hardman . |
| 4,906,044 | 3/1990 | Wilstermann . |
| 4,928,865 | 5/1990 | Lorence et al. . |
| 5,037,157 | 8/1991 | Wain et al. . |
| 5,039,155 | 8/1991 | Suman et al. . |
| 5,096,152 | 3/1992 | Christiansen et al. . |
| 5,104,182 | 4/1992 | Rasnick et al. ............... 297/113 |
| 5,150,946 | 9/1992 | Marfilius et al. . |
| 5,286,084 | 2/1994 | Bart . |
| 5,374,108 | 12/1994 | Szul et al. ............... 297/113 X |
| 5,375,907 | 12/1994 | Rogers et al. ............... 297/113 |
| 5,390,976 | 2/1995 | Doughty et al. ............... 297/115 |
| 5,516,191 | 5/1996 | McKee . |
| 5,524,959 | 6/1996 | Scott . |

*Primary Examiner*—Milton Nelson, Jr.
*Attorney, Agent, or Firm*—Roland A. Fuller, III

[57] ABSTRACT

A seat assembly with a fold-out armrest includes a generally horizontal seat portion and a generally upright back portion having a plurality of seat backs aligned in a row. One of the seat backs is rotatable from a generally upright position to a generally horizontal position and has a padded portion on a forward, occupant facing side when the rotatable seat back is in the upright position and a base portion on a rearward side. An armrest has a first position disposed within the base portion of the rotatable seat back and a second position disposed above the base portion of the rotatable seat back.

14 Claims, 2 Drawing Sheets

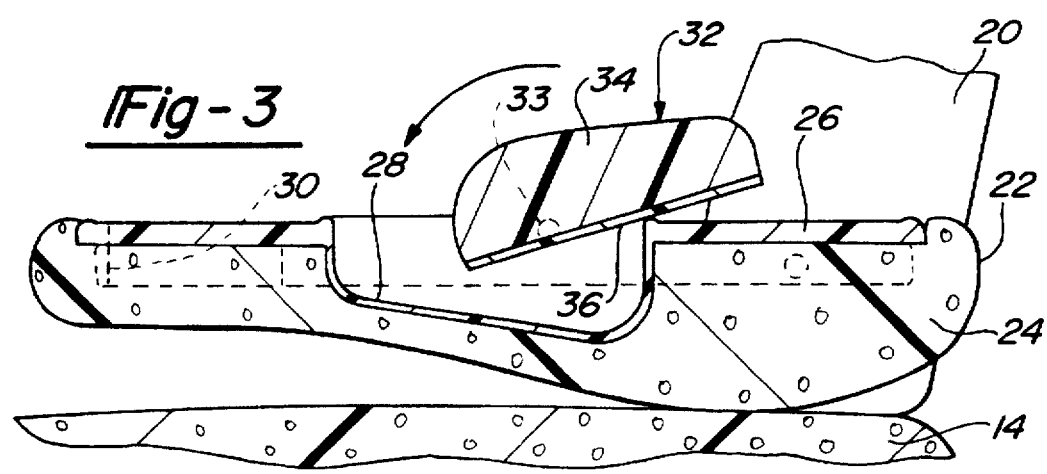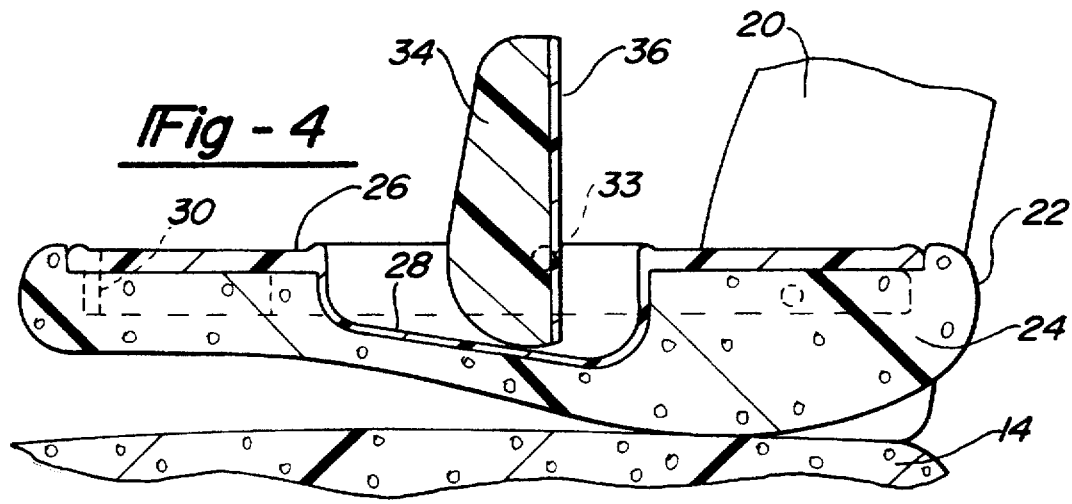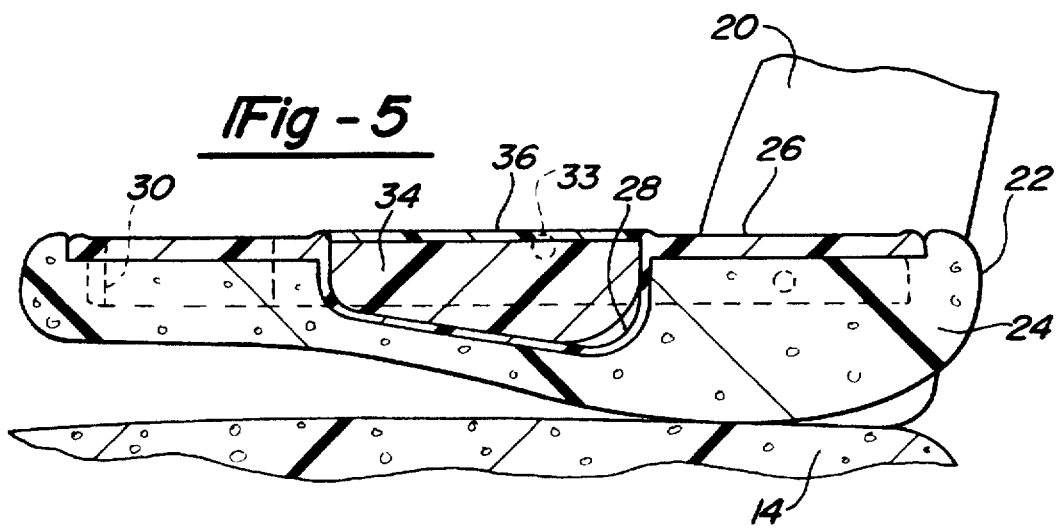

SEAT ASSEMBLY WITH FOLD-OUT ARMREST

BACKGROUND OF THE INVENTION

1. Field of the Invention

The present invention relates generally to seats in motor vehicles and, more particularly, to a seat assembly with a fold-out armrest.

2. Description of Related Art

Motor vehicles, especially automotive vehicles, may have a second row seat assembly. The second row seat assembly has a cushion or seat portion and a back portion. In one type of second row seat assembly the seat portions and the back portions are divided, such as 40/20/40. The back portions fold into a load floor and the divided back portions or seat backs tumble to allow third row ingress and egress.

One disadvantage of the above second row seat assembly is that the back portion does not provide an armrest.

SUMMARY OF THE INVENTION

It is, therefore, one object of the present invention to provide a seat assembly with a fold-out armrest.

It is another object of the present invention to provide a center armrest for a 40/20/40 second row seat assembly in a motor vehicle.

To achieve the foregoing objects, the present invention is a seat assembly having divided seat and back portions with a fold-out armrest including a generally horizontal seat portion and a generally upright back portion. In one embodiment, the back portion has a plurality of seat backs aligned in a row. At least a first one of the seat backs has an upright position aligned with the other seat back and a folded-down position at an angle to the other seat. The first one of the seat backs has a padded portion on a forward, occupant facing side when said seat back is in the up-right position and a base portion on a rearward side. The seat assembly also includes an armrest having a first position disposed within the base portion of the first one of the seat backs and a second position disposed above the base portion when the first one of the seat backs is in its folded-down position.

In another embodiment, the back portion has a pair of outer seat backs spaced transversely and a center seat back disposed between the outer seat backs aligned in a row. The center seat back has an upright position aligned with the outer seat backs and a folded down position at an angle to the outer seat backs. The center seat back has a padded portion on a forward, occupant facing side when the center seat back is in the upright position and a base portion on a rearward side. The seat assembly also includes an armrest having a first position disposed within a base portion of the center seat back and a second position disposed above the base portion when the center seat back is in its folded-down position.

Other objects, features and advantages of the present invention will be readily appreciated as the same becomes better understood after reading the subsequent description when considered in connection with the accompanying drawings.

BRIEF DESCRIPTION OF THE DRAWINGS

FIG. 3 is a sectional view taken along line 3—3 of FIG. 2 illustrating a fold-out position.

FIG. 4 is a view similar to FIG. 3 illustrating an intermediate position.

FIG. 5 is a view similar to FIG. 3 illustrating a stowed position.

DESCRIPTION OF THE PREFERRED EMBODIMENT(S)

Figure 1:
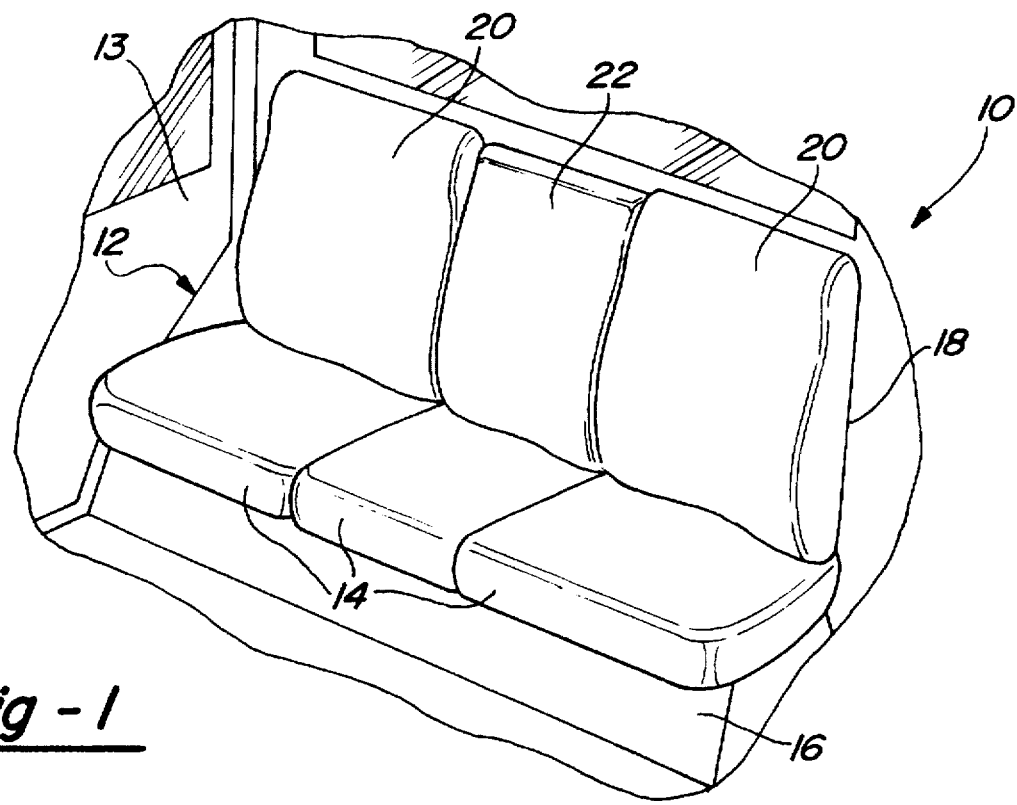
FIG. 1 is a perspective view of a seat assembly with a center fold-out armrest, according to the present invention, illustrated in operational relationship with a motor vehicle.

Referring to FIG. 1, a seat assembly 10, according to the present invention, is illustrated in operational relationship with a motor vehicle, generally indicated at 12, such as an automotive vehicle. The seat assembly 10 is, preferably of a second row type although it could be of any seat row type, disposed within an occupant compartment 13 of the motor vehicle 12 as is known in the art. The seat assembly 10 has a generally horizontal seat portion 14 connected by suitable means (not shown) to vehicle structure 16 of the motor vehicle 12. The seat portion 14 is illustratively divided, such as 50/50, 60/40 or 40/20/40, and is formed in one or more sections as is known in the art.

Figure 2:
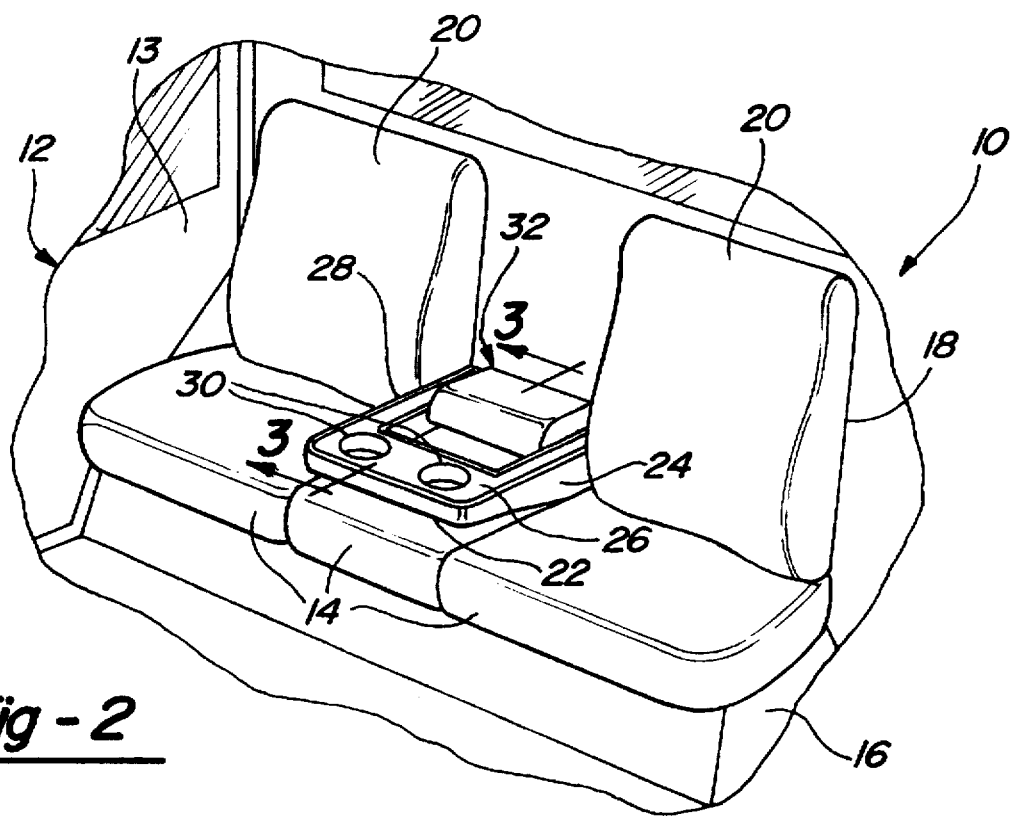
FIG. 2 is a view similar to FIG. 1 illustrating the center fold-out armrest in an operational position.

The seat assembly 10 also includes a generally vertical or upright back portion 18, which is also illustratively divided, such as 50/50, 60/40 or 40/20/40. In the embodiment shown, the back portion 18 includes a pair of outer seat backs 20 spaced transversely and aligned in a row. The outer seat backs 20 are each approximately forty percent (40%) of the back portion 18 and are pivotally connected by suitable means (not shown) to the seat portion 14 to fold into a load floor on the seat portion 14 or tumble to allow third row ingress and egress in the motor vehicle 12. The back portion 18 also includes a center seat back 22 disposed between the outer seat backs 20 and pivotally connected by suitable means (not shown) to the seat portion 14. The center seat back 22 is approximately twenty percent (20%) of the back portion 18 and is folded down on the seat portion 14 to serve as a load floor. It should be appreciated that the center seat back 22 has an upright position aligned with the outer seat backs 20 as illustrated in FIG. 1 and a folded down position at an angle to the outer seat backs 20 as illustrated in FIG. 2.

Referring to FIGS. 2 through 5, the center seat back 22 includes a padded portion 24 on a forward side thereof and a base portion 26 on a rearward side thereof. The padded portion 24 is preferably made of a foam material having a covering on an outer surface thereof such as cloth, leather, vinyl or the like. The base portion 26 is a generally planar plate member lying in a plane and attached to the padded portion 24 by suitable means such as an adhesive. The base portion 26 is made of a rigid material such as plastic. The base portion 26 includes a recess or storage bin 28 extending forwardly into the padded portion 24. The base portion 26 also includes at least one, preferably a pair of recesses or cupholders 30 extending forwardly into the padded portion 24. It should be appreciated that the storage bin 28 and cupholder 30 are integral with the base portion 26 and are, preferably unitary.

The center seat back 22 also includes an armrest, generally indicated at 32, cooperating with the base portion 26. The armrest 32 is pivotally connected to the center seat back 22 by a hinge such as at least one pin member 33. The pin member 33 allows the armrest 32 to be folded-out or pivoted outwardly as illustrated in FIGS. 3 and 4. The armrest 32 includes a padded portion 34 and a surface portion 36 connected to the padded portion 34 by suitable means such as an adhesive. The padded portion 34 is preferably made of a foam material having a covering on an outer surface such as cloth, leather, vinyl or the like. The padded portion 34 has a shape complementary to a shape of the storage bin 28. The surface portion 36 is a generally planar plate member and lies in a common plane with the base portion 26 as illustrated in FIG. 5.

In operation, the center seat back 22 is in an upright position as illustrated in FIG. 1. An operator may fold or pivot the center seat back 22 downwardly to contact the seat portion 14 as illustrated in FIG. 5. In this position, the armrest 32 is in a stowed position such that the padded portion 34 is disposed in the storage bin 28 and the surface portion 36 lies in a plane with the base portion 26. The armrest 32 is grasped by an operator in a recess at a forward end and rotated to uncover the storage bin 28 as illustrated in FIG. 4. The operator continues to rotate the armrest 32 until the surface portion 36 rests against the base portion 26 to remove the padded portion 34 from the storage bin 28. An outboard occupant can then rest their arm on the padded portion 34 of the armrest 32 when seated on the seat portion 14 and outer seat back 20. The operation is reversed to use the writing surface. It should be appreciated that the center seat back 22 serves six purposes: a seat back; a load floor; a writing surface; cupholders; an armrest; and a storage bin.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A seat assembly with a fold-out armrest comprising:

a generally horizontal seat portion;

a generally upright back portion, said back portion having a plurality of seat backs aligned in a row, at least a first one of said seat backs is movable from a generally upright position to a folded-down position, said first one of said seat backs having a padded portion on a forward, occupant facing side when the first one of said seat backs is in the upright position and a base portion on a rearward side, an armrest having a first position disposed within said base portion of said first one of said seat backs and a second position disposed above said base portion of said first one of said seat backs when said first one of said seat backs is in the folded-down position.

2. A seat assembly as set forth in claim 1 wherein said plurality of seat backs comprise three seat backs.

3. A seat assembly as set forth in claim 2 wherein the armrest is disposed in an outboard one of said seat backs.

4. A seat assembly as set forth in claim 2 wherein the armrest is disposed in a center one of said seat backs.

5. A seat assembly as set forth in claim 1 wherein said base portion of said first one of said seat backs includes at least one recess extending into said padded portion of said first one of said seat backs and forming a storage bin.

6. A seat assembly as set forth in claim 5 wherein said armrest is pivotally connected to said first one of said seat backs and pivotal between said first and second positions.

7. A seat assembly as set forth in claim 5 wherein said base portion includes at least one second recess spaced longitudinally from said at least one recess to form a cupholder.

8. A seat assembly as set forth in claim 1 wherein said armrest comprises a generally planar surface portion and a second padded portion attached to said surface portion.

9. A seat assembly as set forth in claim 8 wherein said second padded portion is shaped substantially complementary to a recess disposed in said first one of said seat backs.

10. A seat assembly with a center fold-out armrest comprising:

a generally horizontal seat portion;

a generally upright back portion, said back portion having a pair of outer seat backs spaced transversely and a center seat back disposed between said outer seat backs aligned in a row, the center seat back having an upright position aligned with said outer seat backs and a folded down position at an angle to said outer seat backs, said center seat back having a padded portion on a forward, occupant facing side when the center seat back is in the upright position and a base portion on a rearward side; and an armrest pivotally connected to said center seat back having a first position disposed within said base portion of said center seat back and a second position disposed above the base portion of said center seat back when said center seat back is in its folded-down position.

11. A seat assembly as set forth in claim 10 wherein said base portion includes a first recess extending into said padded portion and forming a storage bin.

12. A seat assembly as set forth in claim 10 wherein said armrest comprises a generally planar surface portion and a padded portion attached to said surface portion.

13. A seat assembly as set forth in claim 12 wherein said padded portion of said armrest is shaped substantially complementary to a recess disposed in said base portion.

14. A seat assembly as set forth in claim 13 wherein said armrest is pivotally connected to said center seat back and pivotal between said first and second positions when said center seat back is in its folded-down position.

* * * * *